United States Patent
Bußer et al.

(10) Patent No.: US 10,931,693 B2
(45) Date of Patent: Feb. 23, 2021

(54) COMPUTATION APPARATUS AND METHOD FOR IDENTIFYING ATTACKS ON A TECHNICAL SYSTEM ON THE BASIS OF EVENTS OF AN EVENT SEQUENCE

(71) Applicant: Siemens Aktiengesellschaft, Munich (DE)

(72) Inventors: Jens-Uwe Bußer, Neubiberg (DE); Jorge Cuellar, Baierbrunn (DE); Michael Munzert, Gräfelfing (DE); Heiko Patzlaff, Munich (DE); Jan Stijohann, Munich (DE)

(73) Assignee: SIEMENS AKTIENGESELLSCHAFT

( * ) Notice: Subject to any disclaimer, the term of this patent is extended or adjusted under 35 U.S.C. 154(b) by 174 days.

(21) Appl. No.: 15/319,525

(22) PCT Filed: Jul. 6, 2015

(86) PCT No.: PCT/EP2015/065371
§ 371 (c)(1),
(2) Date: Dec. 16, 2016

(87) PCT Pub. No.: WO2016/008757
PCT Pub. Date: Jan. 21, 2016

(65) Prior Publication Data
US 2017/0142145 A1 May 18, 2017

(30) Foreign Application Priority Data

Jul. 15, 2014 (DE) .......................... 102014213752.7

(51) Int. Cl.
*H04L 9/00* (2006.01)
*G06F 21/00* (2013.01)
(Continued)

(52) U.S. Cl.
CPC ........ *H04L 63/1425* (2013.01); *G06F 21/554* (2013.01); *H04L 63/1416* (2013.01)

(58) Field of Classification Search
None
See application file for complete search history.

(56) References Cited

U.S. PATENT DOCUMENTS

| 2002/0078381 A1* | 6/2002 | Farley | G06F 21/552 726/23 |
| 2014/0283050 A1* | 9/2014 | Striem Amit | H04L 63/1425 726/23 |
| 2016/0378980 A1* | 12/2016 | Ijiro | G06F 21/55 726/23 |

FOREIGN PATENT DOCUMENTS

| EP | 1 418 484 A2 | 5/2004 |
| EP | 1 628 222 A2 | 2/2006 |

OTHER PUBLICATIONS

J. Herrerias and R. Gomez, "A Log Correlation Model to Support the Evidence Search Process in a Forensic Investigation," Second International Workshop on Systematic Approaches to Digital Forensic Engineering (SADFE'07), Bell Harbor, WA, 2007, pp. 31-42. (Year: 2007).*

(Continued)

*Primary Examiner* — Alexander Lagor
(74) *Attorney, Agent, or Firm* — Schmeiser, Olsen & Watts LLP

(57) ABSTRACT

A computing device is proposed for detecting attacks on a technical system based on events of an event sequence is provided. The computing device has a receiving unit for receiving the event sequence which includes a plurality of events, wherein an attack is determined by a specific sequence in the events in the received event sequence, and a checking unit for checking the received event sequence based on a main event which is contained in the specific (Continued)

sequence in events, wherein the checking unit is additionally designed to carry out a pattern recognition in the received event sequence based on the specific sequence in events if the main event has occurred. As the checking unit merely checks the received event sequence for the occurrence of a main event, and the more exact pattern recognition is only carried out after the main event occurs, the necessary computing expense can be reduced.

11 Claims, 2 Drawing Sheets

(51) Int. Cl.
    *G06F 21/50*     (2013.01)
    *G06F 21/55*     (2013.01)
    *H04L 29/06*     (2006.01)

(56) References Cited

OTHER PUBLICATIONS

International Search Report for PCT Application No. PCT/EP2015/065371, dated Oct. 12, 2015.

\* cited by examiner

COMPUTATION APPARATUS AND METHOD FOR IDENTIFYING ATTACKS ON A TECHNICAL SYSTEM ON THE BASIS OF EVENTS OF AN EVENT SEQUENCE

CROSS-REFERENCE TO RELATED APPLICATIONS

This application claims priority to PCT Application No. PCT/EP2015/065371, having a filing date of Jul. 6, 2015, based off of German application No. DE 102014213752.7 having a filing date of Jul. 15, 2014, the entire contents of both which are hereby incorporated by reference.

FIELD OF TECHNOLOGY

The following relates to a computation apparatus and a method for identifying attacks on a technical system on the basis of events of an event sequence. Furthermore, embodiments of the present invention relates to a computer program product for performing such a method.

BACKGROUND

In various technical systems, attacks can be made on the technical system by third parties. Such attacks need to be identified as quickly and reliably as possible. This can involve the use of attack identification systems (intrusion detection system, IDS), for example, which use sensors to detect events that are then collected in log files. The word "sensor" denotes any equipment, device or a mechanism for detecting or identifying individual "events" that may be of interest for the analysis of an attack or attempted attack. A sensor may be a physical device for measuring physical variables. By way of example, a sensor may also be a program code that notices activities by an IT device with a communication network, input/output device, memory or with processors. At the same time, these events can be checked and processed by a pattern recognition, and the collected data can be compared with signatures from a pattern database.

If the collected data apply to one of the patterns, an alarm is triggered. Such log files have logs, which are also referred to as log files. Such logs are an automatic record or log of events in a file or by means of another technical storage mechanism. Logs are used to reconstruct or interpret situations, but also to be able to quickly and reliably identify critical situations. Logs are used in tests during attack or intruder identification, for example. For tests, a test log records the events during the execution of a test. Logs can also be used in the subsequent interpretation of event sequences, for example in order to understand attacks or attempted attacks (what are known as forensics), but also in order to identify errors of any kind (what is known as debugging). Particularly in the case of attack identification systems, fast identification of critical situations is important.

Stored events in the log files are frequently analyzed by automata. There are various types of such automata that can be used for this purpose. These include deterministic automata, nondeterministic automata and learning automata. For XML data, it is also possible to use tree automata. All of these automata analyze the stored logs in the temporal order. The workload for such processing is very high in some situations, however, necessitating systems having a high computation power.

SUMMARY

Against this background, an aspect relates to identifying attacks on a technical system in a simple manner, with the computation power required being reduced.

A computation apparatus for identifying attacks on a technical system on the basis of events of an event sequence is proposed. The computation apparatus has a reception unit for receiving the event sequence, which has a plurality of events, wherein an attack is determined by a particular sequence of events in the received event sequence, and a checking unit for checking the received event sequence based on a main event that the particular sequence of events contains, wherein the checking unit is set up to perform a pattern recognition in the received event sequence based on the particular sequence when the main event has occurred.

The respective unit, for example reception unit or checking unit, may be implemented in hardware and/or also in software. In the case of a hardware implementation, the respective unit may be in the form of an apparatus or in the form of part of an apparatus, for example in the form of a computer or in the form of a microprocessor. In the case of a software implementation, the respective unit may be in the form of a computer program product, in the form of a function, in the form of a routine, in the form of part of a program code or in the form of an executable object.

By way of example, the computation apparatus may be configured as a processor, microprocessor, computer, PC, server or the like. It may be arranged in a network and communicate with other devices or computation apparatuses, for example with a technical system.

Attacks on or other critical situations in a technical system can be identified on the basis of sequences of events (what are known as traces Tr) that correspond to a pattern M. Individual events of these sequences may also already be indicators that an attack is taking place. Taken on its own, each event is only a weak indicator, only the combination of such events over time being a strong indicator of an attack. However, not all events in a sequence or in a pattern are indicators of the same strength.

An event sequence, also called a log, can be understood to be an n-tuple that consists of multiple events: <(EV_1, param_1, t_1), (EV_2, param_2, t_2), ... (EV_i, param_i, t_i), (EV_n, param_n, t_n)>. In this case, EV signifies an event, param signifies the associated parameter and t signifies the associated time stamp or time of the occurrence.

Examples of possible parameters are an account name, a password and/or a role in an authentication, authorization or login event, a program name, i.e. the name of an exe or dll file, a memory location in the event of a program crash or illegal memory access or a similar event, a program name when an IP socket is opened, a port number and a name of a program eavesdropping on this port when a message is received, IP addresses, URLs, URIs and the like.

In this case, a pattern M contains a subsequence or subset of this n-tuple. The pattern M is an indicator that an attack has taken place. In this case, the probability of an attack when a pattern M occurs in the event sequence P(Att|M) is greater than the probability of an attack without a pattern occurring (P(Att)).

Not all events of the pattern M are an equally strong indicator of an attack. By way of example, an event EV1 may be a stronger indicator than the event EV2. In this case, the following would thus apply: P(ATT|EV1)>P(ATT|EV2) >P(ATT). When the particular sequence of events or the pattern M is sought in the received event sequence, that is to say the n-tuple, a large amount of time is wasted in looking for sequences of very weak indicators. Furthermore, high levels of computer resources are needed.

Therefore, according to the proposed computation apparatus, a main event HEV is selected for which the probability of there being an attack is high. Instead of now searching the whole sequence of events in the received event sequence, merely the received event sequence is examined for this main event, and, if the main event has occurred, a pattern recognition is performed in the received event sequence based on the particular sequence of events.

In the case of the received event sequence: <(EV_1, param_1, t_1), (EV_2, param_2, t_2), ... (HEV_i, param_i, t_i), (EV_n, param_n, t_n), the i-th event could be identified as the main event HEV, for example. Only then is a precise pattern recognition performed.

In this way, a precise check on the received event sequence is performed only when there is already a high probability of an attack. This allows the computation power required to be reduced, since a higher computation power is required only when a main event has occurred.

According to one embodiment, the main event is a particular event from the sequence of events for which the probability of an attack is at a maximum.

The main event HEV is defined in that when this event occurs, the probability of an attack is almost maximized. This means that the conditional probability P(ATT|HEV) is greater than P(ATT|EV), where EV signifies all the events in the particular sequence of events. In this case, the main event signifies an event with a high level of relevance or importance that can therefore be rated as a distinct sign of an attack or critical situation.

According to a further embodiment, the computation apparatus has a memory unit for storing the received event sequence in a log file.

The memory unit may be any type of memory that is capable of storing the received event sequence. This can be accomplished in a log file, for example, which is then examined by the checking unit.

According to a further embodiment, the checking unit is set up to perform a pattern recognition in the stored event sequence, wherein the checking unit begins the pattern recognition at a time before the occurrence of the main event and performs said pattern recognition at least up until the occurrence of the main event.

According to this embodiment, when the main event occurs, a pattern recognition is performed in the hitherto stored event sequence. In this case, the checking unit begins the pattern recognition at a time before the occurrence of the main event and performs the pattern recognition from this past time up until the occurrence of the main event in the stored event sequence. The time before the occurrence of the main event can be chosen according to criteria that convey the experience or intuition of the experts.

By way of example, these criteria can be based on the experience of how long such sequences can last or how long an attack can last, e.g. before a timeout expires, or the like.

According to a further embodiment, the checking unit is set up to begin the pattern recognition at a time before the occurrence of the main event and to continue said pattern recognition beyond the time of the occurrence of the main event.

According to this embodiment, the pattern recognition is begun at a time before the occurrence of the main event and initially performed up until the time of the occurrence of the main event and then continued for the future beyond the time of the occurrence of the main event. In this way, not only the event sequence already received but also the event sequence to be received in the future is checked using a pattern recognition for the whole sequence of the events, i.e. using the complete pattern.

The checking unit can perform the pattern recognition beyond the occurrence of the main event in the stored event sequence if said main event is not the last event in the pattern. This can be accomplished using a second state machine that maps the events after the time of the occurrence of the main event.

According to a further embodiment, the checking unit is set up to perform a backward pattern recognition in the stored event sequence, wherein the checking unit begins the pattern recognition at the time of the occurrence of the main event.

Instead of performing the pattern recognition from a time in the past up until the present or into the future, the checking unit can also perform the pattern recognition backward. This means that from the time of the occurrence of the main event, the stored event sequence is checked backward step by step using a pattern recognition. In this way, it is not necessary to check all of the events in the past, but rather it is possible to gradually progress into the past and, as soon as a pattern has been recognized, abort. The pattern recognition can likewise be aborted when it is identified that the main event has occurred as a sole event without a pattern being recognizable around the main event. This means that the main event has occurred as a single event, but the events at adjacent times do not match the pattern for an attack.

According to a further embodiment, the checking unit has a state machine for checking the event sequence.

By way of example, the checking unit can use a state machine to check the event sequence. The state machine can examine the events in the received event sequence, that is to say subject them to a pattern recognition, in the order of occurrence up until the occurrence of the main event and possibly also beyond.

According to a further embodiment, the checking unit has a first state machine and a second state machine, wherein the first state machine maps the events up until the time of the occurrence of the main event and the second state machine maps the events after the time of the occurrence of the main event.

According to this embodiment, there is provision for at least two state machines. In this case, the first state machine describes the events up until the time of the occurrence of the main event and the second state machine describes the events from the occurrence of the main event into the future, for example up until the time at which an alarm is generated. Depending on what period needs to be examined, one of the two automata is used for this purpose.

According to a further embodiment, the first state machine is suited to checking the event sequence backward.

The first state machine can be reversed, this being accomplished using a method in automata theory that is understood to be reversal or mirroring of the regular language of the state machine. By way of example, this allows a deterministic automaton to be formed from the first automaton.

According to a further embodiment, the checking unit is set up to output an alarm signal based on a result of the pattern recognition.

When the pattern recognition yields a positive result, that is to say that an attack has taken place, the checking unit can generate an alarm signal. This alarm signal can be transferred to the technical system, which can then take appropriate countermeasures.

According to a further embodiment, the event sequence has outputs from sensors of the technical system.

The event sequence may have values from sensors, for example, these values being able to be altered in the event of an attack on the technical system. A particular pattern of altered values, that is to say a particular pattern of events, is therefore identified as an attack on the technical system.

According to a further embodiment, the computation apparatus is part of an attack identification system for identifying attacks on the technical system.

In order to identify attacks on a technical system, which may be any type of system on which attacks can be made from the outside, an attack identification system can be used. This may be arranged inside the technical system, or provided as a separate apparatus. The computation apparatus may be part of such an attack identification system.

According to a further aspect, a method for identifying attacks on a technical system on the basis of events of an event sequence is proposed. The method has the following steps: reception of the event sequence, which has a plurality of events, wherein an attack is determined by a particular sequence of events in the received event sequence, and checking of the received event sequence based on a main event that the particular sequence of events contains, wherein a pattern recognition is performed in the received event sequence based on the particular sequence of events when the main event has occurred.

The embodiments and features described for the proposed apparatus apply to the proposed method accordingly.

Additionally, a computer program product is proposed that prompts performance of the method as explained above on a program-controlled device.

A computer program product, such as e.g. a computer program means, can be provided or delivered as a storage medium, for example, such as e.g. a memory card, USB stick, CD ROM, DVD, or in the form of a downloadable file from a server in a network. This can be accomplished in a wireless communication network, for example, by the transmission of an appropriate file having the computer program product or the computer program means.

Further possible implementations of embodiments of the invention also comprise—not explicitly cited—combinations of features or embodiments described above or below for the exemplary embodiments. In this case, a person skilled in the art would also add individual aspects as improvements or additions to the respective basic form of embodiments of the invention.

BRIEF DESCRIPTION

Some of the embodiments will be described in detail, with reference to the following figures, wherein like designations denote like members, wherein.

In the figures, elements that are the same or that have the same function have been provided with the same reference symbols, unless indicated otherwise.

DETAILED DESCRIPTION

Figure 1:
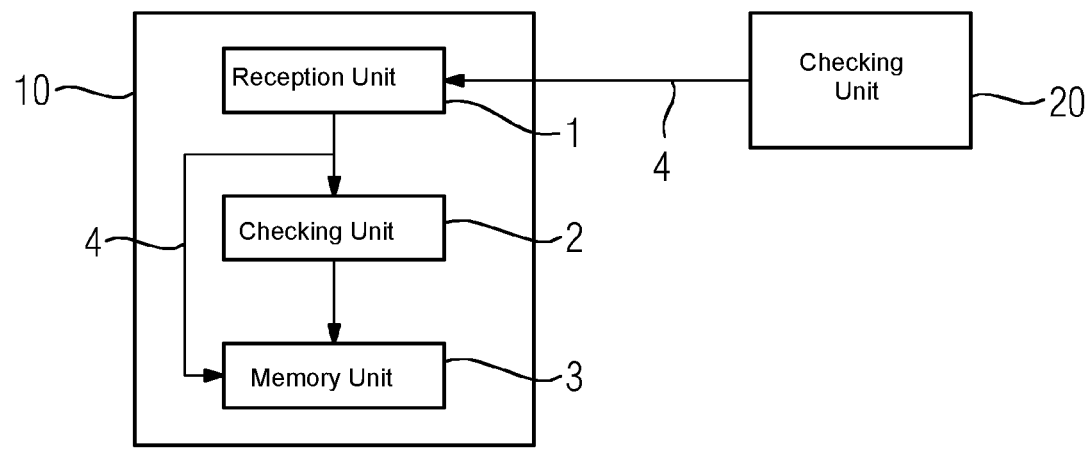
FIG. 1 shows a schematic block diagram of an exemplary embodiment of a computation apparatus for identifying attacks on a technical system.

FIG. 1 shows a computation apparatus 10 for identifying attacks on a technical system 20 on the basis of events of an event sequence 4.

Sensors (not shown) can detect events that are then transferred to the computation apparatus 10 as event sequence 4. These sensors may be part of the technical system 20, or part of an attack identification system (not shown). In this context, sensors can detect network-based events, such as an access to a particular server or an Internet page, for example, or can also detect host-based events, such as login attempts by a user, access to memory areas, for example.

A reception unit 1 receives the event sequence 4, which has a plurality of such events. An attack on the technical system can be determined on the basis of a particular sequence of events in the received event sequence. Said sequence can be referred to as a pattern M.

To this end, a checking unit 2 first of all checks the received event sequence for whether a particular main event occurs. If this main event occurs, the checking unit 20 can perform a pattern recognition in the event sequence 4. To this end, the checking unit 2 can perform a pattern recognition in the event sequence 4 received hitherto, for example, which may be stored in a memory unit 3. Additionally, the checking unit 2 can also perform a pattern recognition for an event sequence 4 received in the future.

Since the checking unit 2 initially performs only a coarse analysis of the received event sequence to determine whether a particular main event occurs, the computation complexity and the required computation power are reduced.

The checking unit 2 can be realized by state machines, for example. Examples of state machines A, A' and $\overline{A}$ are depicted in FIG. 2.

The states Z1, Z2, Z3 of the automata A, A' and $\overline{A}$ have no special significance, but they code the relevant part of the past information in a suitable manner. As such, e.g. a state may mean that a particular sequence of events a, b has taken place without another relevant event having taken place in this time. In this case, a first state machine A is used that describes the events up until the occurrence of the main event, and a second state machine (not shown) that describes the events after the occurrence of the main event into the future.

As soon as a main event occurs, the state machine A can be inverted or reversed. Reversal of the state machine A is the deterministic variant $\overline{A}$ of the automaton A, with the arrows in reverse order. This reversed state machine $\overline{A}$ accepts the same sequences as A, but in the reverse order. The reversed state machine $\overline{A}$ allows the past to be entered step by step from the occurrence of the main event, in order to check whether a particular sequence of events occurs that correspond to a pattern that depicts the first part of an attack, i.e. the part in the past. The second part, i.e. the part of the attack in the future, is checked by means of the unaltered second automaton.

Figure 2:
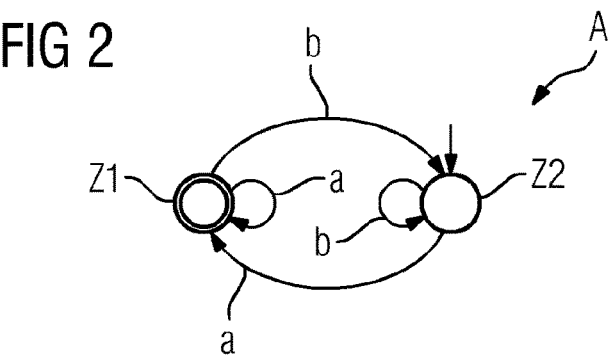
FIG. 2 shows two state machines that are used for pattern recognition.
Figure 2:
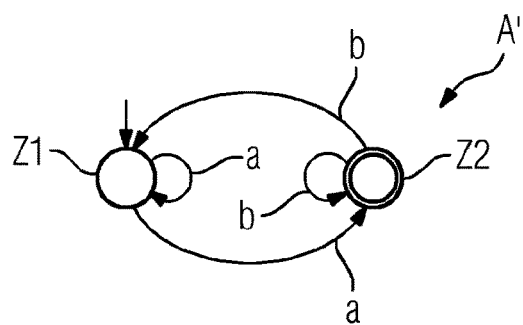
Figure 2:
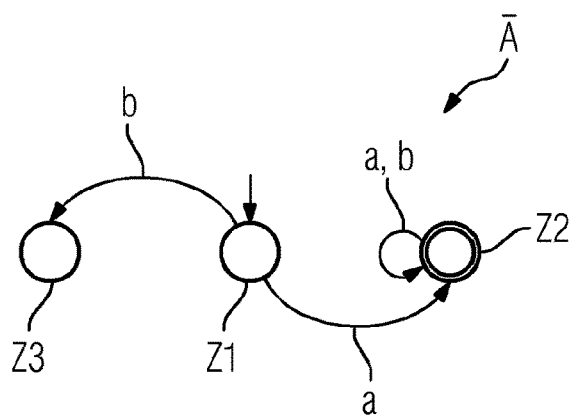

FIG. 2 shows a possible example of the first automaton A. In this case, Z1 and Z2 depict two states. Starting from these states, various events a, b can occur, which are depicted as state transitions. In the first automaton A, the accepting state is Z1 and the initial state is Z2. The automaton A recognizes all sequences that end with the event "a".

The automaton A' recognizes the reversal language, i.e. the accepting state and the initial state are interchanged, and the arrows, i.e. the state transitions, have a reversed order. This automaton A' recognizes all sequences that begin with "a". The automaton A' is nondeterministic, however, and hence unsuitable for the pattern recognition.

The automaton $\overline{A}$ is the deterministic version of the automaton A' that recognizes the reversal language. The automaton Ā recognizes all sequences that begin with "a". How an automaton is reversed and how a nondeterministic variant of an automaton can be constructed are known from Hoperoft, Motwani, Ullman: Introduction to Automata Theory, Languages, and Computation, November 2000, for example.

Figure 3:
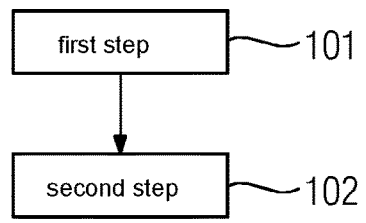
FIG. 3 shows a schematic flowchart for an exemplary embodiment of a method for identifying attacks on a technical system.

FIG. 3 shows a method for identifying attacks on a technical system 20 on the basis of events of an event sequence 4.

In a first step 101, the event sequence 4, which has a plurality of events, is received. In this case, an attack is determined by a particular sequence of events in the received event sequence 4.

In a second step 102, the checking unit 2 checks the received event sequence 4 based on a main event that the particular sequence of events contains. If the main event has occurred, a pattern recognition is performed in the received event sequence 4 based on the particular sequence of events.

Although the present invention has been described on the basis of exemplary embodiments, it is modifiable in diverse ways.

The invention claimed is:

1. A computation apparatus for identifying attacks on a technical system on the basis of events of an event sequence, having:
    a reception unit for receiving the event sequence, which has a plurality of events, wherein an attack is determined by a particular sequence of events in the received event sequence, and
    a checking unit for checking the received event sequence based on a main event that the particular sequence of events contains, wherein the checking unit is set up to initially perform only a coarse analysis of the received event sequence to determine whether the main event has occurred, wherein the checking unit is set up to perform a pattern recognition in the received event sequence based on the particular sequence of events only when the main event has occurred and after the initially performed coarse analysis, wherein the main event is selected as a particular event from the sequence of events for which the probability of attack is high,
    a memory unit for storing the received event sequence in a log file,
    wherein the checking unit is set up to perform a backward pattern recognition in the stored event sequence only when the main event has occurred, wherein the checking unit begins the pattern recognition at the time of the occurrence of the main event.

2. The computation apparatus as claimed in claim 1, wherein the main event is a particular event from the sequence of events for which the probability of an attack is at a maximum.

3. The computation apparatus as claimed in claim 1, wherein the checking unit has a state machine for checking the event sequence.

4. The computation apparatus as claimed in claim 1, wherein the checking unit has a first state machine and a second state machine, wherein the first state machine maps the events up until the time of the occurrence of the main event and the second state machine maps the events after the time of the occurrence of the main event.

5. The computation apparatus as claimed in claim 4, wherein the first state machine is suited to checking the event sequence backward.

6. The computation apparatus as claimed in claim 1, wherein the checking unit is set up to output an alarm signal based on a result of the pattern recognition.

7. The computation apparatus as claimed in claim 1, wherein the event sequence has outputs from sensors of the technical system.

8. The computation apparatus as claimed in claim 7, wherein the computation apparatus is part of an attack identification system for identifying attacks on the technical system.

9. A method for identifying attacks on a technical system on the basis of events of an event sequence, involving:
    reception of the event sequence, which has a plurality of events, wherein an attack is determined by a particular sequence of events in the received event sequence,
    providing a memory unit for storing the received event sequence in a log file,
    initially performing only a coarse analysis of the received event sequence to determine whether a main event has occurred, and
    after the performed coarse analysis, checking of the received event sequence based on the main event that the particular sequence of events contains, wherein a pattern recognition is performed in the received event sequence based on the particular sequence of events only when the main event has occurred, wherein the main event is a particular event from the sequence of events for which the probability of an attack is high, wherein a checking unit is set up to perform a backward pattern recognition in the stored event sequence only when the main event has occurred, wherein the checking unit begins the pattern recognition at the time of the occurrence of the main event.

10. A computer program product comprising a non-transitory computer readable medium that stores computer executable code that when executed on a processor performs the method as claimed in claim 9 on a program-controlled device.

11. A computation apparatus for identifying attacks on a technical system on the basis of events of an event sequence, having:
    a reception means for receiving the event sequence, which has a plurality of events, wherein an attack is determined by a particular sequence of events in the received event sequence, and
    a checking means for checking the received event sequence based on a main event that the particular sequence of events contains, wherein the checking unit is set up to initially perform only a coarse analysis of the received event sequence to determine whether the main event has occurred, wherein the checking unit is set up to perform a pattern recognition in the received event sequence based on the particular sequence of events only when the main event has occurred and after the initially performed coarse analysis, wherein the main event is a particular event from the sequence of events for which the probability of an attack is high,
    a memory means for storing the received event sequence in a log file, wherein the checking means is set up to perform a backward pattern recognition in the stored event sequence only when the main event has occurred, wherein the checking means begins the pattern recognition at the time of the occurrence of the main event.

* * * * *